(12) United States Patent
Kawasaki

(10) Patent No.: US 9,823,888 B2
(45) Date of Patent: Nov. 21, 2017

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Hiroki Kawasaki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/841,269

(22) Filed: Aug. 31, 2015

(65) Prior Publication Data

US 2016/0062717 A1 Mar. 3, 2016

(30) Foreign Application Priority Data

Sep. 3, 2014 (JP) .................. 2014-179328

(51) Int. Cl.
*G06F 15/00* (2006.01)
*G06F 3/12* (2006.01)
*H04W 4/00* (2009.01)
*H04B 5/00* (2006.01)
*H04W 76/02* (2009.01)

(52) U.S. Cl.
CPC .......... *G06F 3/1292* (2013.01); *G06F 3/1204* (2013.01); *G06F 3/1236* (2013.01); *G06F 3/1286* (2013.01); *G06F 3/1294* (2013.01); *H04B 5/0031* (2013.01); *H04W 4/008* (2013.01); *H04W 76/023* (2013.01)

(58) Field of Classification Search
CPC .... G06F 3/1204; G06F 3/1236; G06F 3/1286; G06F 3/1292; G06F 3/1294
USPC .......................................................... 358/1.15
See application file for complete search history.

(56) References Cited

U.S. PATENT DOCUMENTS

| 8,909,600 B2 * | 12/2014 | Numakami ....... G06F 17/30575 707/610 |
| 2011/0238847 A1 | 9/2011 | Scott |
| 2014/0094117 A1 * | 4/2014 | Rajendran ............ H04W 12/04 455/41.1 |
| 2014/0293331 A1 * | 10/2014 | Asai ...................... G06F 3/1286 358/1.15 |

FOREIGN PATENT DOCUMENTS

| EP | 2757837 A1 | 7/2014 |
| JP | 2013-157736 A | 8/2013 |

* cited by examiner

*Primary Examiner* — Mark Milia
(74) *Attorney, Agent, or Firm* — Canon USA Inc., IP Division

(57) ABSTRACT

A portable terminal transmits a print job to a print apparatus, by connecting to an access point based on connection information acquired from an NFC tag. On completion of the transmission of the print job, the portable terminal deletes the connection information acquired from the NFC tag, from a memory, so that the connection information acquired from the NFC tag is not displayed in a connection history.

6 Claims, 11 Drawing Sheets

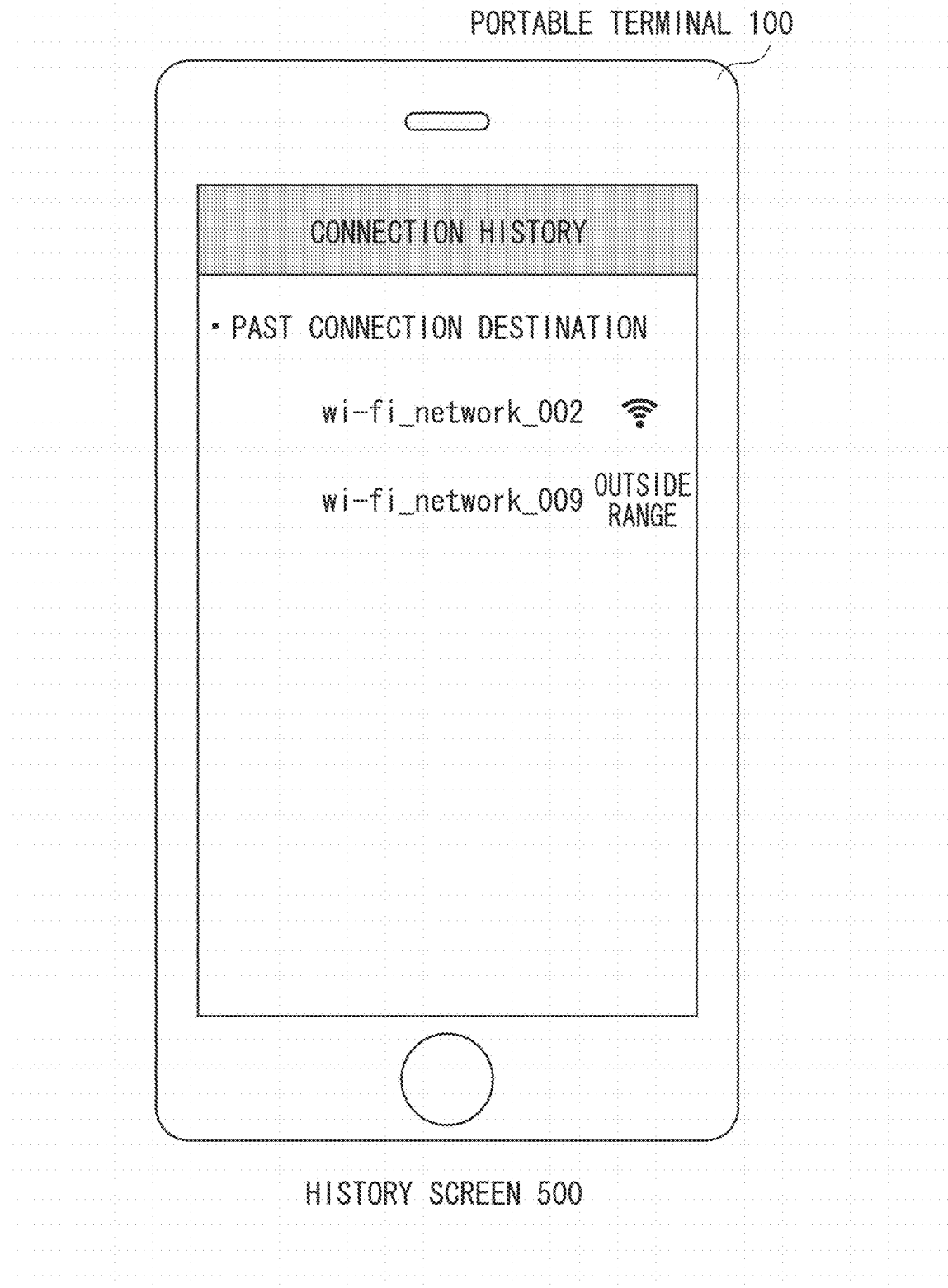

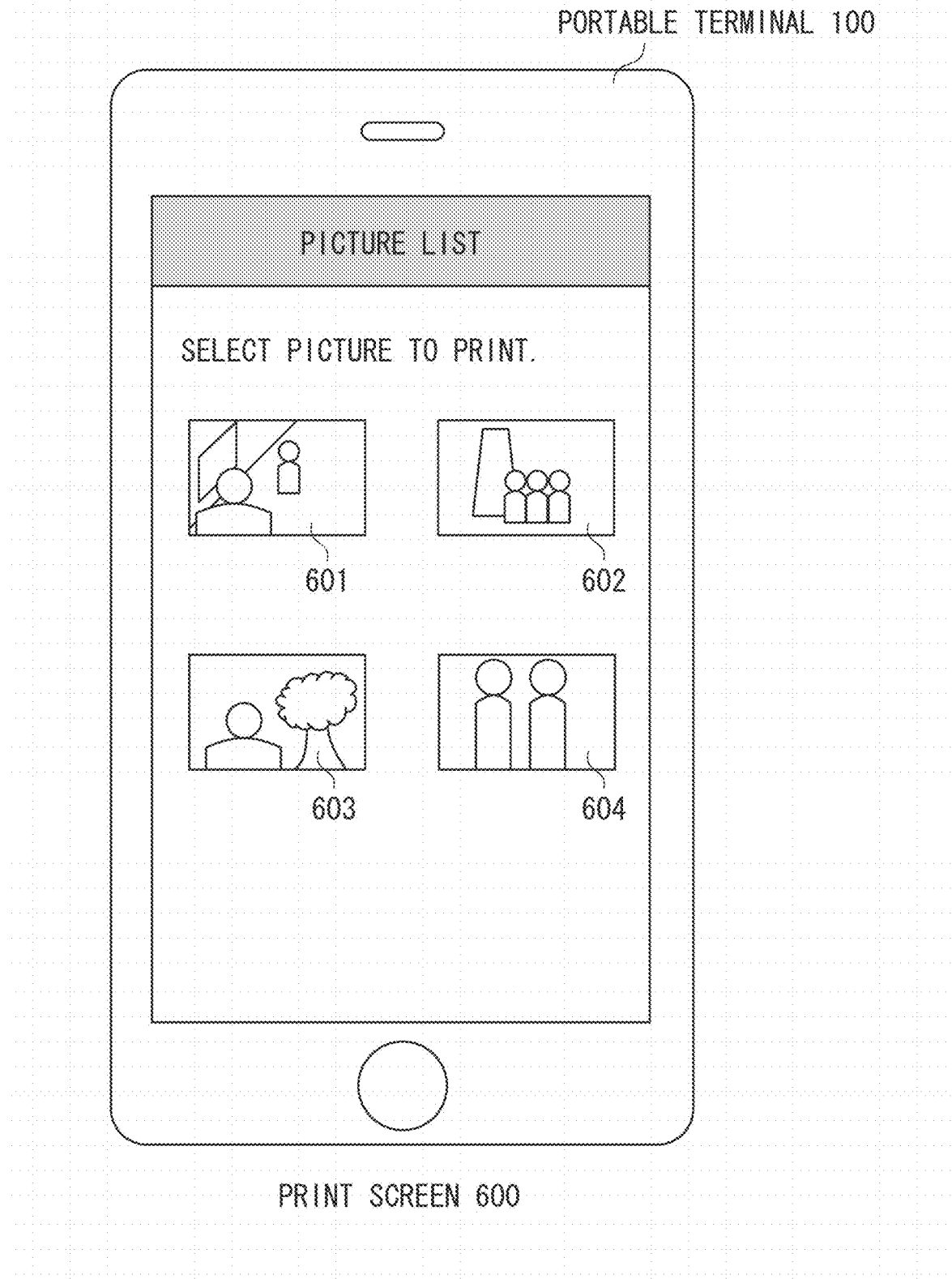

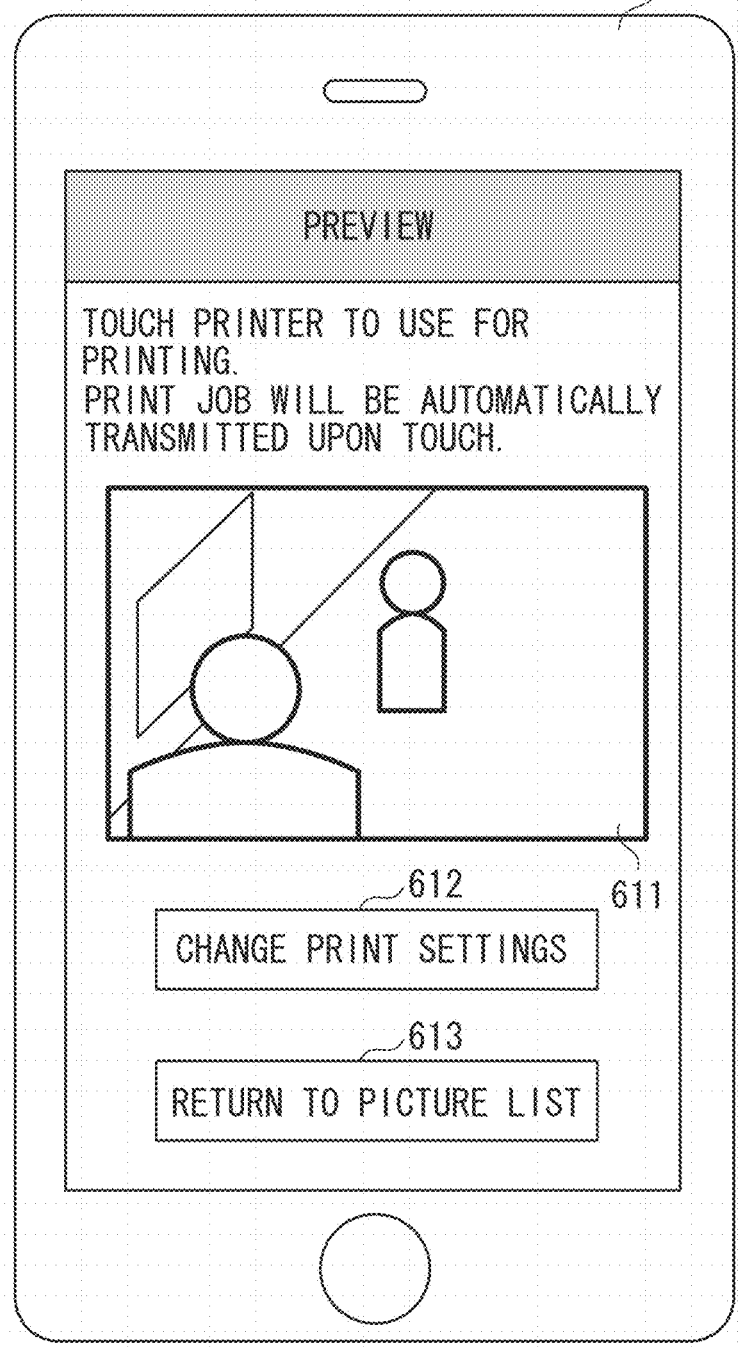

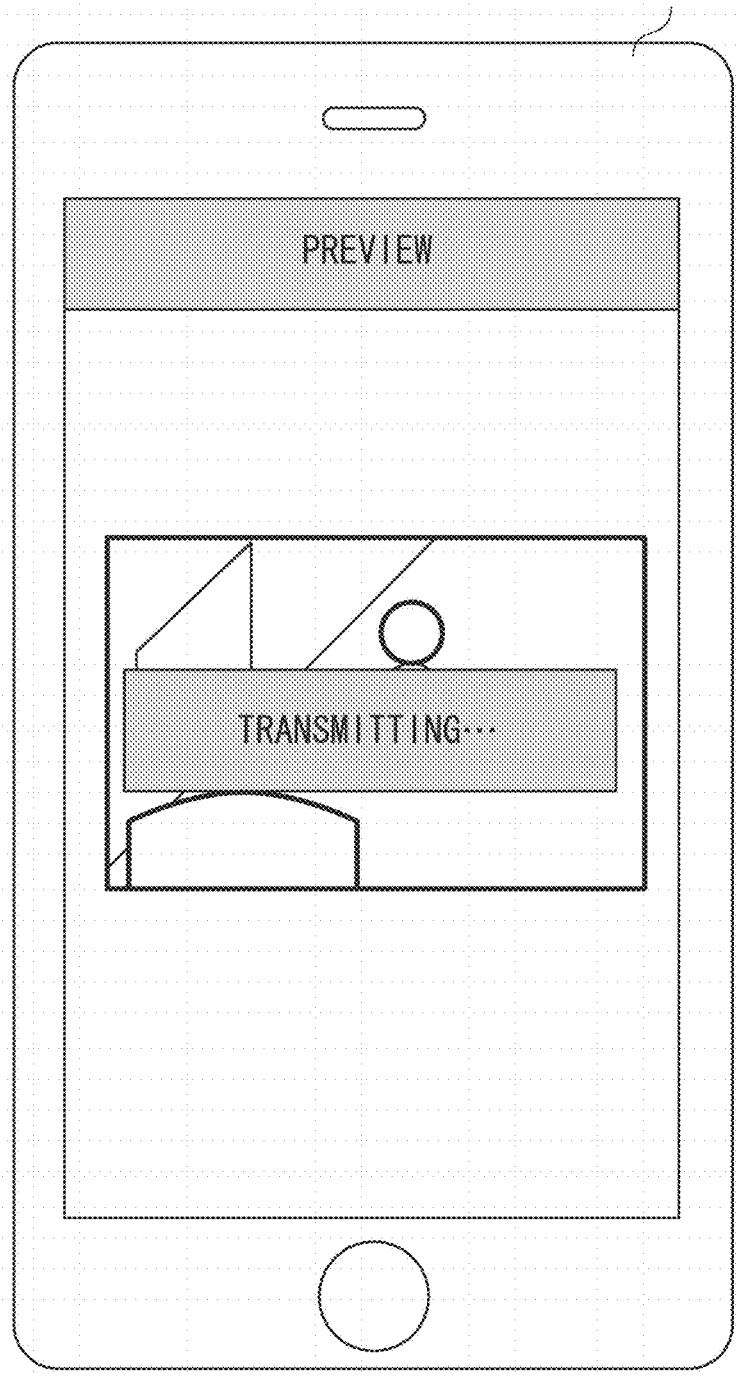

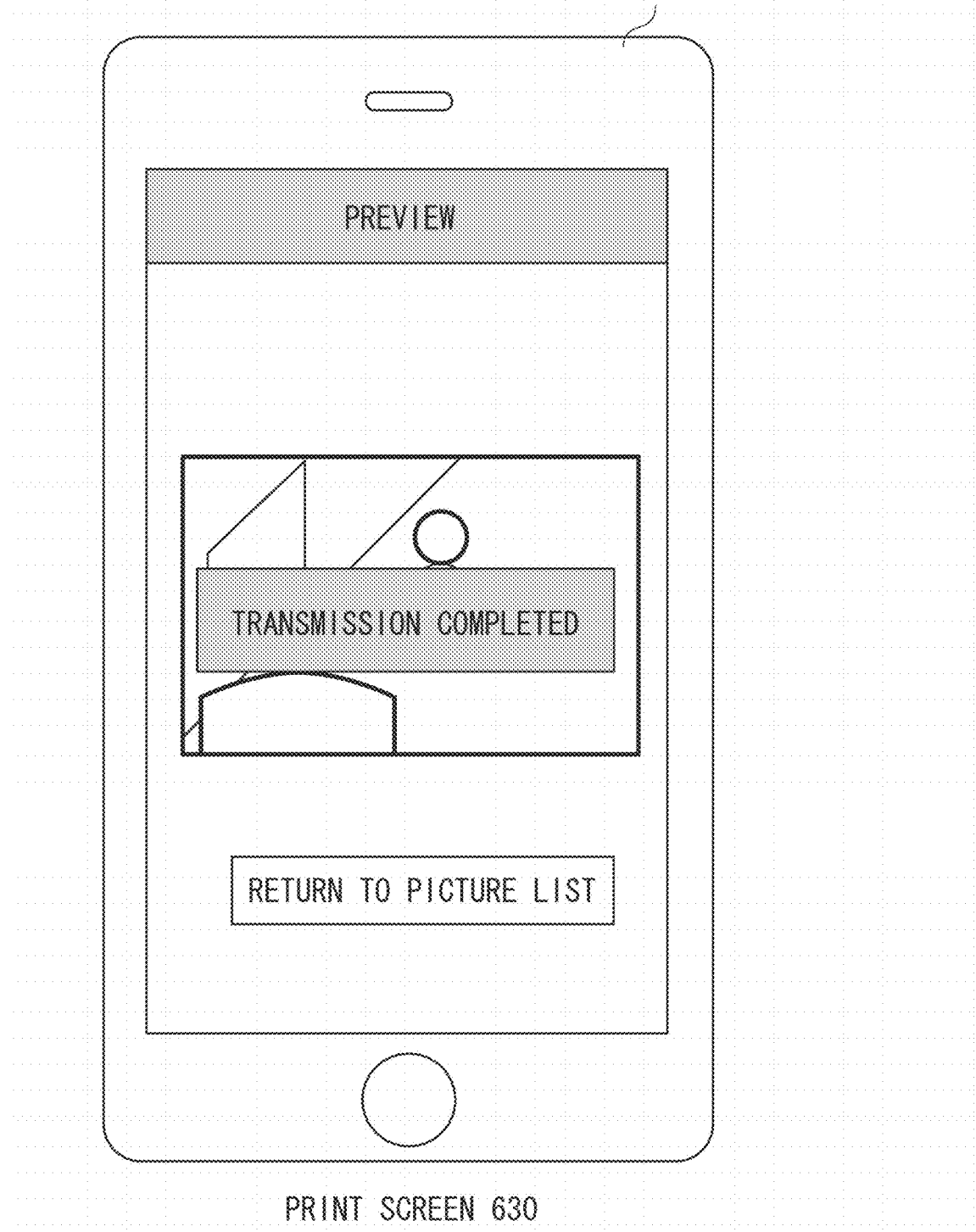

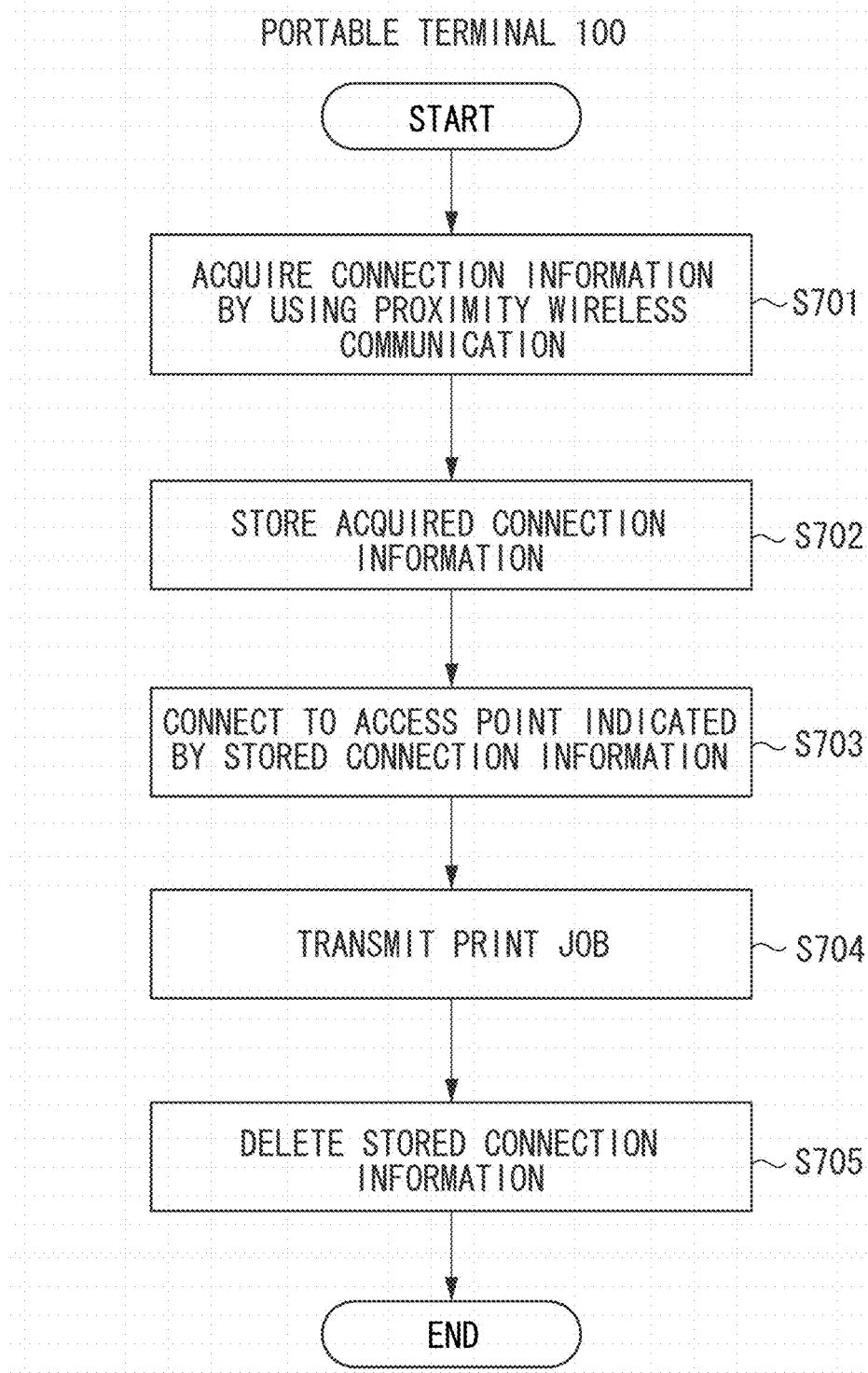

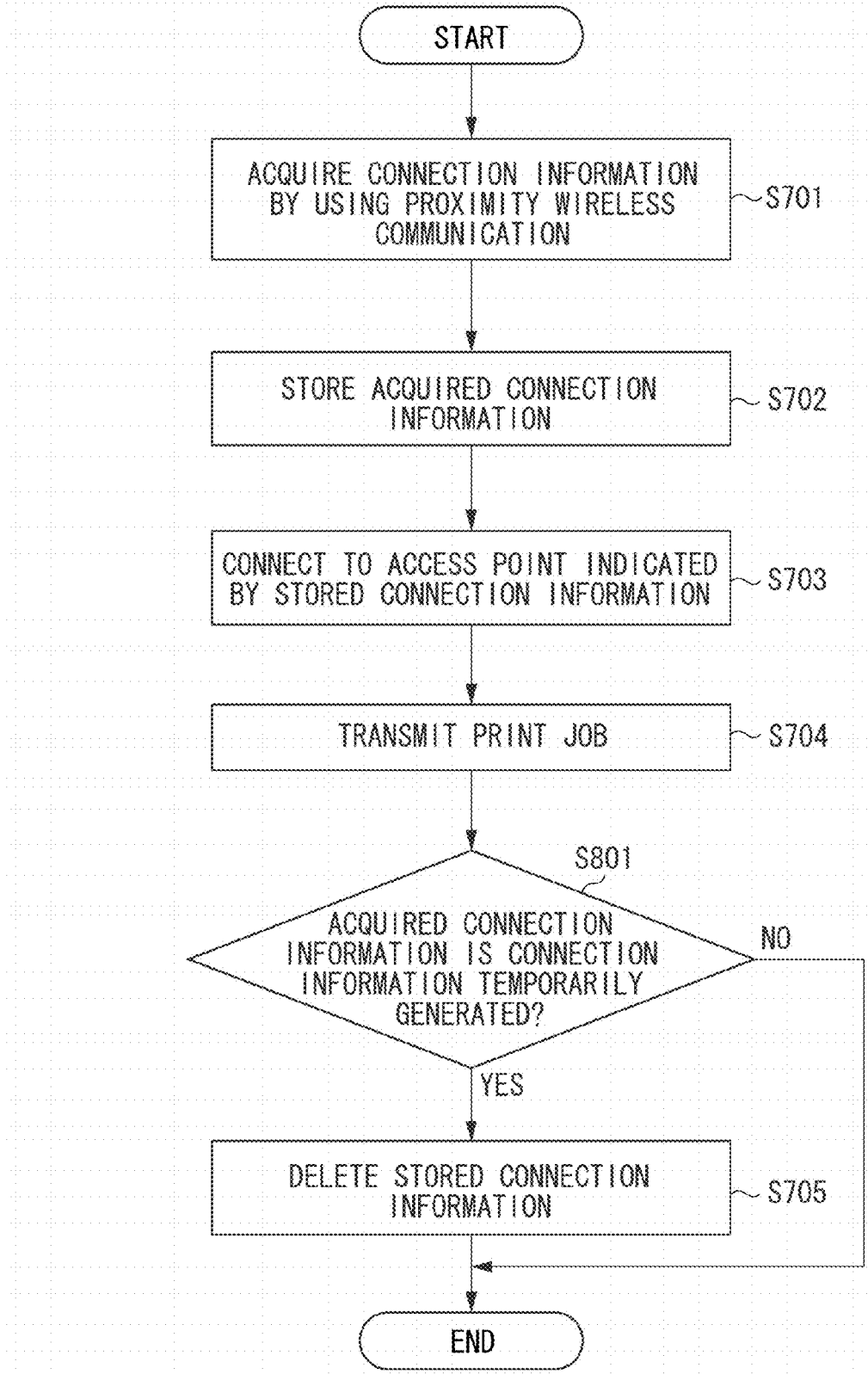

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for an information processing apparatus, and a storage medium, which enable execution of wireless communication.

Description of the Related Art

Portable terminals such as a smartphone and a tablet personal computer (PC) each have a wireless communication capability. Uses of such a wireless communication capability include, for example, transmitting a picture or an electronic document stored in the portable terminal to a printer by using wireless communication, so that the printer performs printing therefor.

This type of portable terminal needs to establish wireless communication by connecting to an access point, to execute the wireless communication with an external apparatus such as a printer. As a method of establishing the wireless communication, handover using Near Field Communication (NFC) is known (for example, see Japanese Patent Application Laid-Open No. 2013-157736). The handover is a method of establishing wireless communication based on connection information (e.g., a service set identifier (SSID)) necessary to execute the wireless communication, by acquiring the connection information through use of proximity wireless communication such as NFC. This handover allows a user to establish wireless communication between a portable terminal and an external apparatus such as a printer, only by bringing the portable terminal close to (or only by causing the portable terminal to touch) the external apparatus.

Meanwhile, an access point is not always necessary between the portable terminal and the external apparatus. Direct wireless communication can be established between the portable terminal and the external apparatus, by causing the external apparatus to act as an access point. The above-described handover can be implemented in such a mode as well.

The portable terminal stores the connection information that has been used to establish the wireless communication. This allows the portable terminal to automatically reconnect to the access point, thereby improving convenience of the user.

The above-described handover is performed to establish the wireless communication temporarily between the portable terminal and the external apparatus. In other words, it may be said that the connection information acquired by using the proximity wireless communication is information for a temporary use. If the portable terminal stores this connection information for the temporary use each time the portable terminal performs the handover, the stored information may reach a maximum quantity storable in the portable terminal. If the quantity of the connection information to be stored reaches the maximum quantity storable in the portable terminal, important connection information (for example, connection information indicating an access point used at home by the user) may be deleted.

SUMMARY OF THE INVENTION

The present invention is directed to effectively using a storage area for storing connection information.

According to an aspect of the present invention, an information processing apparatus includes a wireless communication unit configured to execute wireless communication by connecting to an access point, a storage unit configured to store access point information about the access point, a display unit configured to display a connection history of connection to access point, based on information stored by the storage unit, an acquisition unit configured to acquire access point information by using proximity wireless communication, and a control unit configured to perform, when the acquisition unit acquires access point information by using the proximity wireless communication, control not to display an access point indicated by the acquired access point information, in the connection history.

Further features of the present invention will become apparent from the following description of exemplary embodiments with reference to the attached drawings.

BRIEF DESCRIPTION OF THE DRAWINGS

FIG. 5 is a diagram illustrating a history screen displaying a history of connection destinations.

FIGS. 6A, 6B, 6C, and 6D are diagrams illustrating a flow of a touch print function.

FIG. 7 is a flowchart illustrating processing to be executed in a first exemplary embodiment.

FIG. 8 is a flowchart illustrating processing to be executed in a second exemplary embodiment.

DESCRIPTION OF THE EMBODIMENTS

Exemplary embodiments of the present invention will be described below, with reference to the attached drawings. The following exemplary embodiments are not intended to limit the invention according to the scope of claims, and all the combination of features described in the exemplary embodiments is not necessarily essential to a solution of the invention.

Figure 1:
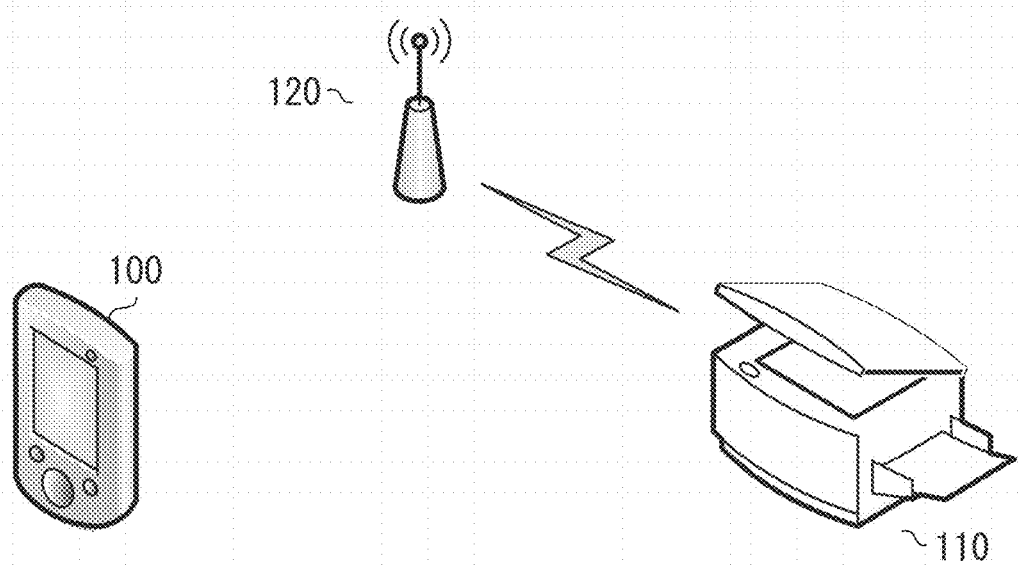
FIG. 1 is a diagram illustrating a communication system.

First, a configuration of a communication system according to a first exemplary embodiment of the present invention will be described using FIG. 1. The communication system according to the first exemplary embodiment includes a portable terminal 100, a print apparatus 110, and an access point 120.

The print apparatus 110 executes wireless communication such as Wi-Fi communication, with the access point 120. Communication between the access point 120 and the print apparatus 110 may be wire communication using a cable such as a local area network (LAN) cable.

The portable terminal 100 can execute the wireless communication such as Wi-Fi communication. A user inputs a service set identifier (SSID) and a security key of the access point 120 into the portable terminal 100, so that the portable terminal 100 connects to the access point 120. This allows the portable terminal 100 to communicate with the print apparatus 110 via the access point 120. The portable terminal 100 can transmit a print job to an external apparatus such as the print apparatus 110, via the access point 120. Upon receiving the print job, the print apparatus 110 executes printing.

The wireless communication between the portable terminal 100 and the print apparatus 110 is not necessarily performed via the access point 120. The portable terminal 100 and the print apparatus 110 may execute direct wireless communication, by allowing the print apparatus 110 to operate as an access point. As a scheme of such wireless communication, various types are established which include ad hoc mode, access point mode, and Wi-Fi Direct.

In addition, the portable terminal 100 and the print apparatus 110 can execute proximity wireless communication such as Near Field Communication (NFC). The print apparatus 110 includes an NFC tag (a proximity wireless communication tag). The NFC tag stores connection information (access point information) for executing the wireless communication such as Wi-Fi communication. The connection information is, for example, the SSID of the access point 120. When the portable terminal 100 and the print apparatus 110 perform the direct wireless communication, the connection information may be a SSID temporarily generated by the print apparatus 110. Further, the connection information may include an encrypting key for connection to an access point indicated by a SSID.

The portable terminal 100 acquires the connection information from the NFC tag of the print apparatus 110 by using NFC, and establishes the wireless communication with the print apparatus 110, based on the acquired connection information. In this way, the connection may be switched to the wireless communication such as Wi-Fi communication, by using the connection information acquired via the proximity wireless communication such as NFC. This is called "handover". The handover allows the user to be free from work for inputting information for establishing wireless communication, e.g., a SSID, into the portable terminal 100.

Figure 2:
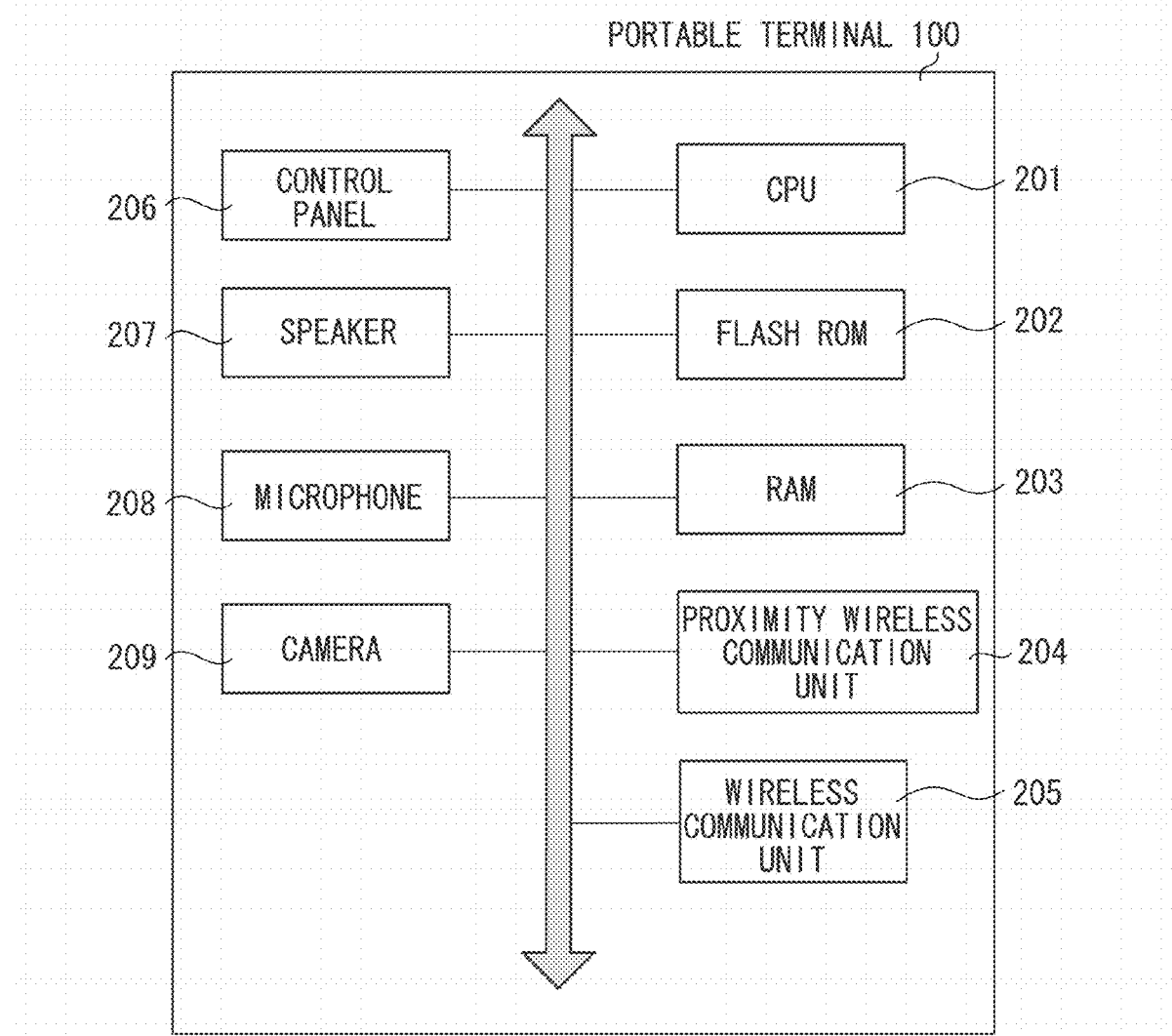
FIG. 2 is a diagram illustrating a hardware configuration of a portable terminal.

Next, a hardware configuration of the portable terminal 100 will be described using FIG. 2. The portable terminal 100 of the present exemplary embodiment is assumed to be an apparatus such as a smartphone or a tablet personal computer (PC). However, the portable terminal 100 may be another type of apparatus if this apparatus is an information processing apparatus capable of executing wireless communication.

A central processing unit (CPU) 201 reads a control program stored in a flash read only memory (ROM) 202, to execute various kinds of processing for controlling operations of the portable terminal 100. The flash ROM 202 stores the control program, image data such as pictures, and various kinds of setting data. A random access memory (RAM) 203 is used as a temporary storage area serving as a main memory or a work area for the CPU 201.

In the portable terminal 100, the CPU 201, which is a single CPU, is assumed to execute each process in a flowchart to be described below. However, other mode may be adopted. For example, one or more CPUs may execute each process in the flowchart to be described below, by working together.

A proximity wireless communication unit 204 executes the proximity wireless communication such as NFC. In the present exemplary embodiment, the print apparatus 110 includes the NFC tag. The user brings the portable terminal 100 close to the NFC tag of the print apparatus 110, so that the proximity wireless communication is established between the proximity wireless communication unit 204 and the NFC tag of the print apparatus 110. The proximity wireless communication unit 204 then acquires the information stored in the NFC tag. The proximity wireless communication executed by the proximity wireless communication unit 204 is not limited to NFC, and may be, for example, Bluetooth (registered trademark) communication.

A wireless communication unit 205 executes the wireless communication such as Wi-Fi communication. For the user of the portable terminal 100, the wireless communication by the wireless communication unit 205 can be implemented through simple operation, by using the handover. Specifically, the wireless communication unit 205 can connect to the access point 120 or the print apparatus 110, by using the connection information (e.g., the SSID) acquired by the proximity wireless communication unit 204 from the NFC tag of the print apparatus 110.

A control panel 206 has a touch panel function capable of detecting touch operation of the user, and displays various operation screens provided by an operating system (OS) 310 and a print application 300 to be described below. The user can input a desired operating instruction into the portable terminal 100, by inputting touch operation into the control panel 206. The portable terminal 100 includes hardware keys (not illustrated), and the user can input operating instructions into the portable terminal 100, by using the hardware keys.

In making a call to another portable terminal or a fixed telephone, the user uses a speaker 207 and a microphone 208. A camera 209 performs imaging, according to an imaging instruction provided by the user. A picture obtained by the imaging performed by the camera 209 is stored in a predetermined area of the flash ROM 202.

Figure 3:
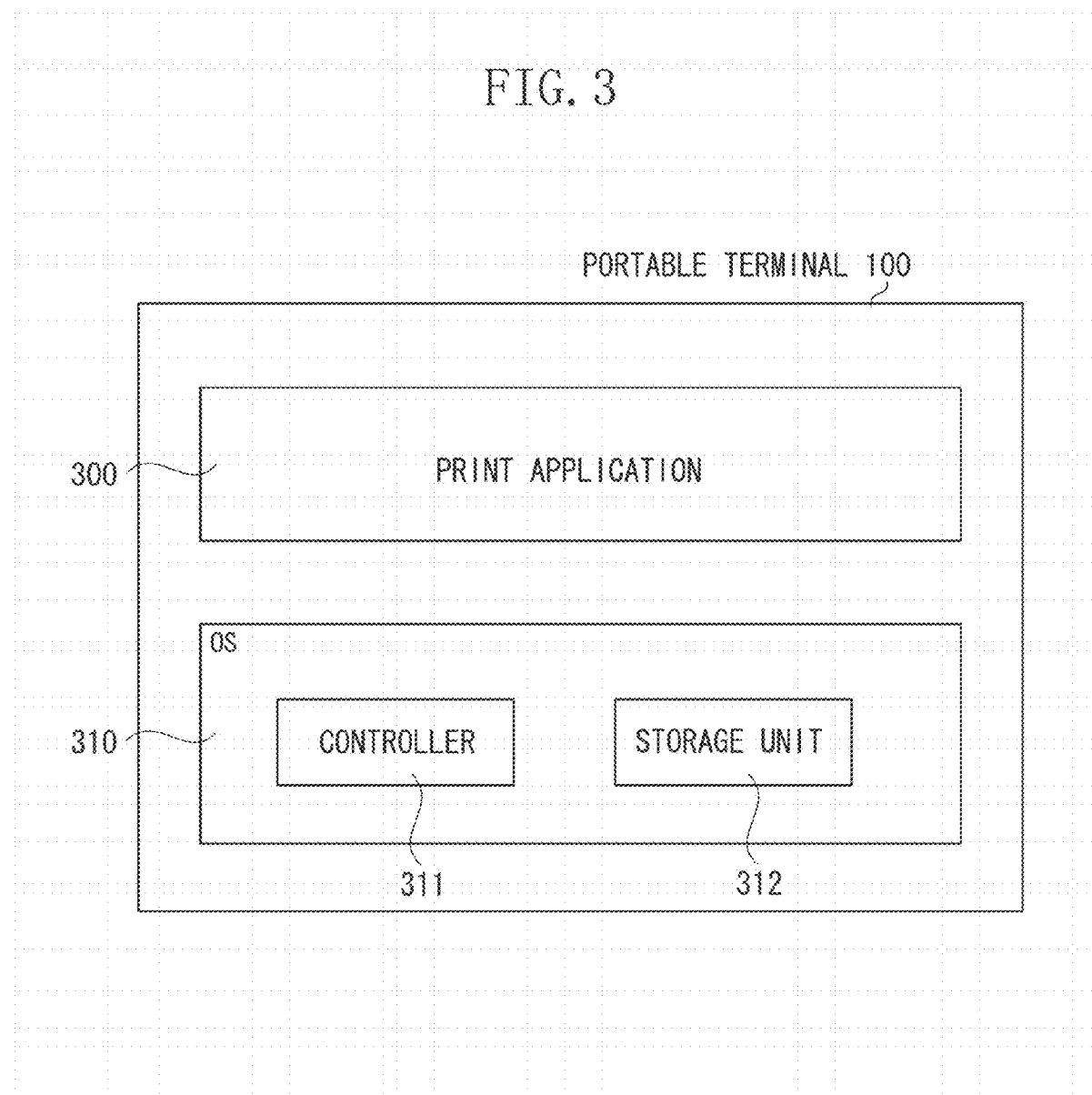
FIG. 3 is a diagram illustrating a software configuration of the portable terminal.

Next, a software configuration of the portable terminal 100 will be described using FIG. 3. FIG. 3 is a functional block diagram of software, which is implemented when the CPU 201 reads the control program stored in the flash ROM 202.

The OS 310 is software for controlling operations of the entire portable terminal 100. A controller 311 controls operations of the entire OS 310. Various applications including the print application 300 to be described below can be installed on the portable terminal 100. The controller 311 exchanges information with these applications, thereby changing a screen to be displayed on the control panel 206, or causing the wireless communication unit 205 to execute the wireless communication, according to an instruction received from any of the applications.

Figure 4:
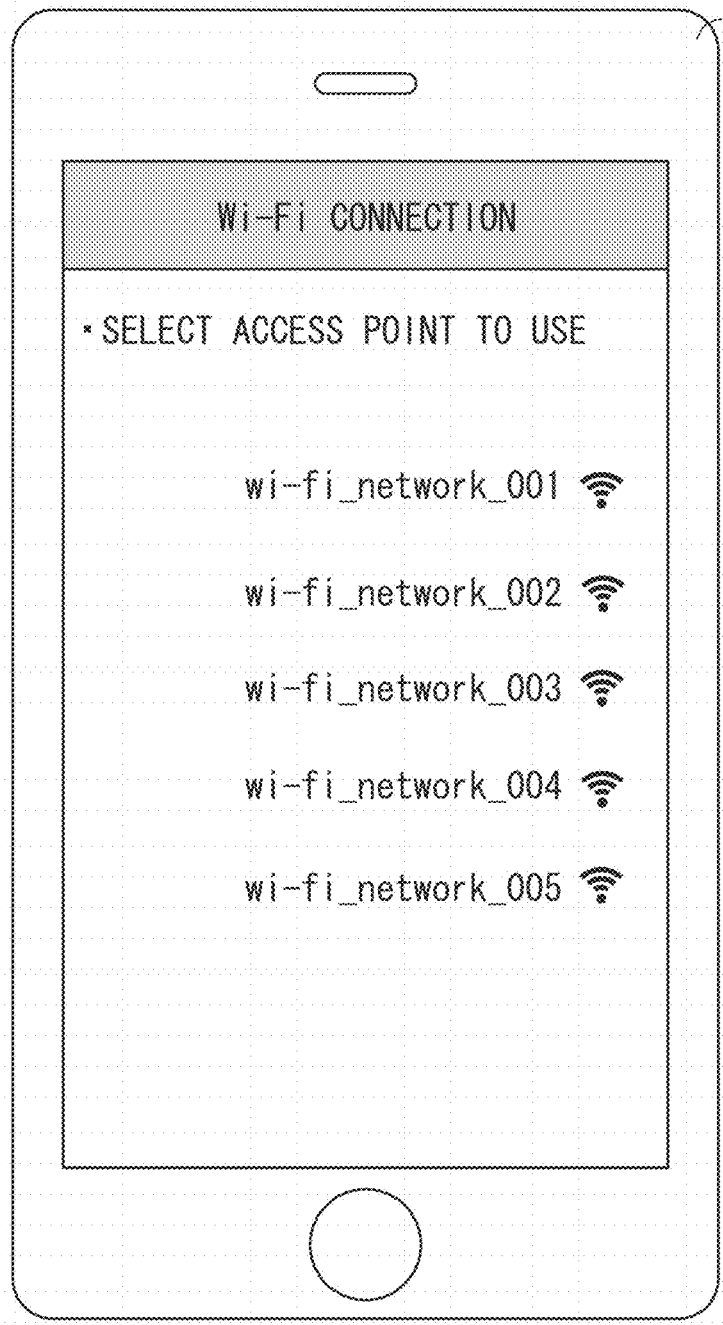
FIG. 4 is a diagram illustrating a selection screen for selecting an access point as a connection destination.

FIG. 4 illustrates a selection screen 400 displayed on the control panel 206 by the OS 310. The selection screen 400 receives designation of a connection destination from the user, for performing Wi-Fi connection. The portable terminal 100 searches for a neighboring access point, and a search result is displayed on the selection screen 400. The user selects a desired access point from the search result, and connects the portable terminal 100 to the selected access point. The designation of the access point as the connection destination is not limited to selection from a list of the search result. The user may directly input a SSID or a connection key of an access point.

A storage unit 312 of the OS 310 stores the connection information, which is used in the connection when the wireless communication is executed by the wireless communication unit 205, into a memory such as the flash ROM 202. Specifically, the stored connection information includes information of the access point received as a result of the selection on the selection screen 400, and information of the access point acquired from the NFC tag by the proximity wireless communication unit 204 via the proximity wireless communication.

FIG. 5 illustrates a history screen 500 displayed on the control panel 206 by the OS 310. The history screen 500 displays a history of access points used by the portable terminal 100 in the past connections. The history screen 500 is displayed based on the information stored by the storage unit 312.

The print application 300 is installed on the portable terminal 100, to be used for execution of printing. Various applications other than the print application 300 are installed on the portable terminal 100, but will not be described.

Next, an outline and screen transitions of a print function implemented by the print application 300 will be described using FIGS. 6A, 6B, 6C, and 6D. A screen illustrated in each of FIGS. 6A to 6D is displayed on the control panel 206 by the print application 300.

A print screen 600 in FIG. 6A displays a list of pictures stored in the flash ROM 202. The print screen 600 displays, as an example, a case where four pictures 601, 602, 603, and 604 appear. On the print screen 600, the user selects a picture that the user desires to print.

Upon selection of a picture on the print screen 600 by the user, a print screen 610 in FIG. 6B appears. The print screen 610 displays, as an example, a case where the picture 601 is selected. In an area 611, the picture selected by the user on the print screen 600 is displayed in an enlarged form, so that the user can confirm the selected picture. The user may select an icon 612, when the user desires to change print settings. Further, the user may select an icon 613, when the user desires to return to a picture list window (the print screen 600).

When the user brings the portable terminal 100 close to (e.g., causes the portable terminal 100 to touch) the NFC tag of the print apparatus 110 in a state where the print screen 610 is displayed, the proximity wireless communication unit 204 reads the information stored in the NFC tag of the print apparatus 110. In the present exemplary embodiment, the NFC tag of the print apparatus 110 stores the connection information for enabling the wireless communication unit 205 to execute the wireless communication with the print apparatus 110. The wireless communication unit 205 can execute the wireless communication with the print apparatus 110, based on the connection information, which is acquired by reading of the NFC tag of the print apparatus 110 performed by the proximity wireless communication unit 204.

When the wireless communication unit 205 connects to the access point (the access point 120 or the print apparatus 110) indicated by the connection information, the print application 300 generates a print job and transmits the generated print job to the print apparatus 110. The connection information, which is acquired by the wireless communication unit 205 via the proximity wireless communication, includes an IP address of the print apparatus 110. The print apparatus 110 transmits the print job to this IP address, which is a destination.

When the print application 300 starts transmitting the print job, a print screen 620 in FIG. 6C appears on the control panel 206. When the transmission of the print job is completed, a print screen 630 in FIG. 6D appears on the control panel 206.

The print function implemented by the print application 300 has been described in a flow, by using FIGS. 6A to 6D. This print function is implemented by causing the portable terminal 100 to touch the print apparatus 110 and therefore will be hereinafter referred to as "touch print function".

Next, processing to be executed when the portable terminal 100 transmits the print job to the print apparatus 110 will be described using a flowchart of FIG. 7. The CPU 201 loads the control program stored in the memory such as the flash ROM 202 into the RAM 203, and executes the loaded control program, to implement each step in the flowchart of FIG. 7.

The user brings the portable terminal 100 close to the NFC tag of the print apparatus 110, in a state where a picture to be printed is selected by the user (i.e., the state where the print screen 610 is displayed). Then, in step S701, the proximity wireless communication unit 204 acquires the connection information from the NFC tag, by using the proximity wireless communication. There may be a case where the NFC tag of the print apparatus 110 stores the SSID of the access point 120, as the connection information. There may also be a case where the NFC tag stores the SSID that is temporarily generated by the print apparatus 110 to perform the direct wireless communication between the portable terminal 100 and the print apparatus 110.

Upon acquisition of the connection information from the NFC tag by the proximity wireless communication unit 204, the processing proceeds to step S702. In step S702, the storage unit 312 stores the acquired connection information in a predetermined area of the flash ROM 202.

Next, in step S703, the wireless communication unit 205 connects to the access point indicated by the connection information stored in step S702. The wireless communication between the portable terminal 100 and the print apparatus 110 is established by this process in step S703.

Next, in step S704, the wireless communication unit 205 transmits the print job to the print apparatus 110. In the present exemplary embodiment, the print application 300 generates the print job for printing the picture selected on the print screen 600 by the user, and transmits the generated print job to the print apparatus 110, in step S704. Upon receiving the print job transmitted in step S704, the print apparatus 110 executes print processing based on the received print job.

Upon completion of the transmission of the print job, an application termination process is executed. As a part of this termination process, in step S705, the CPU 201 deletes the connection information stored in step S702. Specifically, the print application 300 instructs the OS 310 to delete the connection information stored in step S702. Upon being instructed, the OS 310 deletes the connection information stored in step S702, i.e., the connection information acquired from the NFC tag by the proximity wireless communication.

The connection information acquired from the NFC tag by the proximity wireless communication is information to be used temporarily for execution of printing. Each time the print application 300 executes the touch print function, the storage unit 312 stores the connection information to be used temporarily. In this case, the storage unit 312 stores a large amount of connection information. For example, if the storage unit 312 stores the large amount of connection information to be used temporarily, the history screen 500 displays many pieces of information, which leads to a poor appearance.

In addition, the quantity of the connection information stored by the storage unit 312 may reach a maximum quantity storable by the storage unit 312. In this case, other important connection information, e.g., connection information indicating an access point used by the user at home, may be deleted, to store the connection information newly acquired from the NFC tag by the proximity wireless communication. This decreases convenience of the user.

In the present exemplary embodiment, the connection information acquired from the NFC tag by the proximity wireless communication, i.e., the connection information to be used temporarily, is deleted in step S705. This process prevents deterioration in the appearance of the history screen 500, and deletion of the important connection information due to an increase in the stored connection information.

In the present exemplary embodiment, what is deleted in step S705 is the connection information acquired from the NFC tag by the proximity wireless communication. The connection information, which is selected by the user on the selection screen 400 in FIG. 4 or directly input by the user, is displayed on the history screen 500 without being deleted in step S705. This is because the connection information selected by the user on the selection screen 400 in FIG. 4 and the connection information directly input by the user are considered to be, for example, connection information intended for use at home or office and the connection information that is not intended for temporal use. In other words, it may be said that the processing described with reference to the flowchart of FIG. 7 is processing of performing control not to display the connection information acquired from the NFC tag by the proximity wireless communication, on the history screen 500.

A modification of the first exemplary embodiment will be described as a second exemplary embodiment. In the first exemplary embodiment, the connection information acquired from the NFC tag by the proximity wireless communication is invariably deleted in step S705. In contrast, a configuration of distinguishing between connection information to be deleted and connection information that is not to be deleted, without invariably deleting the connection information acquired from the NFC tag by the proximity wireless communication is described in the second exemplary embodiment.

When the print apparatus 110 operates as an access point, the print apparatus 110 generates a SSID at random. This SSID generated at random is temporarily generated connection information, and thus cannot be used later even if this connection information is stored by the storage unit 312. Therefore, deleting this connection information in step S705 poses no problem. Accordingly, the present exemplary embodiment is intended to delete the SSID generated at random, i.e., the temporarily generated SSID, among pieces of connection information equivalent to the connection information acquired from the NFC tag by the proximity wireless communication.

Processing to be executed in the present exemplary embodiment will be described using a flowchart of FIG. 8. The CPU 201 loads a control program stored in the memory such as the flash ROM 202 into the RAM 203, and executes the loaded control program, to implement each step in the flowchart of FIG. 8. The flowchart of FIG. 8 is a modification of the flowchart of FIG. 7. Therefore, in steps having the same numbers as the steps in the flowchart of FIG. 7, the same processes as the steps in FIG. 7 are executed. Accordingly, these steps in the flowchart of FIG. 8 will not be described.

Upon transmission of the print job in step S704, an application termination process is executed. As a part of this termination process, in step S801, the CPU 201 determines whether the connection information acquired from the NFC tag by the proximity wireless communication is the temporarily generated connection information. The print application 300 executes this determination in step S801.

When the print apparatus 110 operates as an access point, the print apparatus 110 generates a SSID of "DIRECT-XXXXX-OOOO". In this SSID, a part except for "DIRECT" is generated at random. In step S801, it is determined whether the SSID acquired from the NFC tag by the proximity wireless communication is a SSID beginning with "DIRECT". If this acquired connection information is a SSID beginning with "DIRECT", it is determined that the connection information acquired from the NFC tag by the proximity wireless communication is the temporarily generated connection information (Yes in step S801).

If it is determined that the connection information acquired from the NFC tag by the proximity wireless communication is the temporarily generated connection information (Yes in step S801), the processing proceeds to step S705. In step S705, the CPU 201 deletes the connection information stored in step S702.

In the present exemplary embodiment, among pieces of connection information equivalent to the connection information acquired from the NFC tag by the proximity wireless communication, the temporarily generated connection information is deleted. However, if the acquired SSID is not the temporarily generated connection information(No in step S801), e.g., if the acquired SSID is the SSID of the access point 120, this connection information is not deleted in step S705, even if this connection information is acquired from the NFC tag by the proximity wireless communication.

If the acquired connection information is not the temporarily generated SSID (the SSID generated at random), i.e., if the acquired connection information is, for example, the SSID of the access point 120, the user can use this connection information later, even if this connection information is acquired from the NFC tag by the proximity wireless communication. Since the connection information that can be used later is saved without being deleted, convenience of the user improves.

(Other Embodiments)

In each of the exemplary embodiments as described above, the example in which the portable terminal 100 transmits the print job to the print apparatus 110 has been described. However, data communication executed between the portable terminal 100 and the print apparatus 110 is not limited to the transmission of the print job. For example, the data communication may be executed for enabling an HDD of an external apparatus such as the print apparatus 110 to store a picture or an electronic document stored in the portable terminal 100. Further, the data communication may be executed for enabling the portable terminal 100 to acquire a scanned image, which is generated by scanning of a document by the print apparatus 110, from the print apparatus 110.

The present invention is also achievable by such processing that a program implementing one or more functions of each of the above-described exemplary embodiments is supplied to a system or apparatus via a network or storage medium, and one or more processors in the computer of the system or the apparatus read the program and then execute the read program. Moreover, the present invention is also achievable by a circuit (e.g., an application-specific integrated circuit (ASIC)) that implements one or more functions.

According to the exemplary embodiments of the present invention, the storage area for storing the connection information can be effectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-179328, filed Sep. 3, 2014, which is hereby incorporated by reference herein in its entirety.

What is claimed is:

1. An information processing apparatus comprising:
a first wireless communicator that performs proximity wireless communication using NFC;
a second wireless communicator that performs wireless communication;
a display that displays an access point connection history based on information stored in a storage unit included in the information processing apparatus;
a memory that stores instructions;
at least one processor that, based on execution of the instructions, executes:
controlling, in a case where the first wireless communicator acquires connection information from an NFC tag of an external apparatus, the second wireless communicator to connect to an access point indicated by the acquired connection information and to transmit data to the external apparatus, wherein the acquired connection information is stored in the storage unit;
determining whether the acquired connection information is generated at random; and
deleting the acquired connection information from the storage unit, in a case where the transmission of the data is completed and it is determined that the acquired connection information is generated at random,
wherein the deleting of the acquired connection information from the storage unit based on completion of the transmission of data is not performed, in a case where it is determined that the acquired connection information is not generated at random.

2. The information processing apparatus according to claim 1, wherein the external apparatus is a printing apparatus and the data is a print job.

3. The information processing apparatus according to claim 1, wherein, in a case where the acquired connection information includes a predetermined character string, it is determined that the acquired connection information is the connection information generated at random.

4. The information processing apparatus according to claim 1,
wherein the acquired connection information includes an SSID generated by the external apparatus, and
wherein the processor controls the second wireless communicator to connect to an access point indicated by the SSID.

5. A control method for an information processing apparatus comprising a first wireless communicator that performs proximity wireless communication using NFC, a second wireless communicator that performs wireless communication and a display that displays an access point connection history based on information stored in a storage unit included in the information processing apparatus, the control method comprising:
controlling, in a case where the first wireless communicator acquires connection information from an NFC tag of an external apparatus, the second wireless communicator to connect to an access point indicated by acquired connection information, wherein the connection information is stored in the storage unit;
determining whether the acquired connection information is generated at random; and
deleting, from the storage unit, the acquired connection information in a case where transmission of the data has been completed and it is determined that the acquired connection information is generated at random;
wherein the deleting of the acquired connection information from the storage unit based on completion of the transmission of data is not performed, in a case where it is determined that the acquired connection information is not generated at random.

6. The control method for the information processing apparatus according to claim 5,
wherein the external apparatus is a printing apparatus and the data is a print job.

* * * * *